Figures 1, 2, 3:
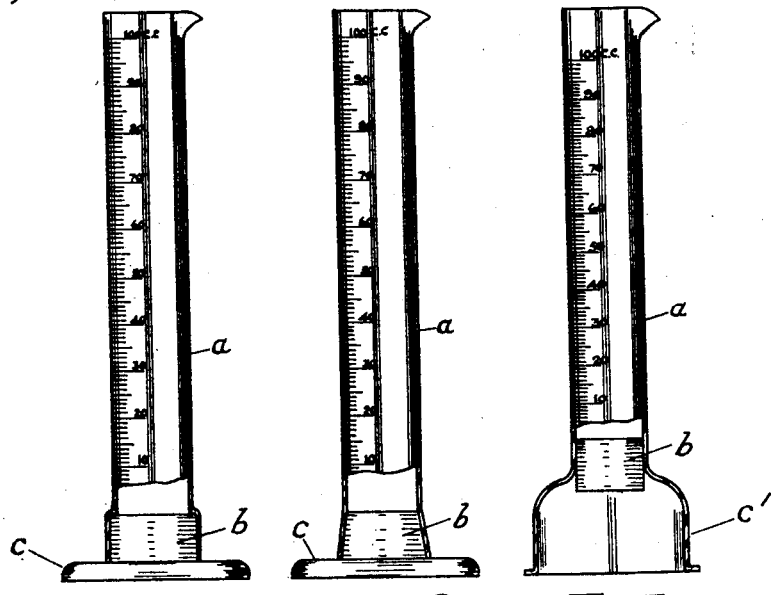

A. MOND.
GLASS CHEMICAL WARE.
APPLICATION FILED OCT. 2, 1918.

1,399,394.

Patented Dec. 6, 1921.

UNITED STATES PATENT OFFICE.

ALBERT MOND, OF LONDON, ENGLAND.

GLASS CHEMICAL WARE.

1,399,394.   Specification of Letters Patent.   Patented Dec. 6, 1921.

Application filed October 2, 1918. Serial No. 256,595.

*To all whom it may concern:*

Be it known that I, ALBERT MOND, doctor of science of the University of Geneva, a subject of the King of Great Britain, residing at 19 Southampton Buildings, Chancery Lane, London, W. C., England, have invented certain new and useful Improvements in Glass Chemical Ware, of which the following is a specification.

The present invention relates to improvements in the manufacture of glass ware, such as measuring cylinders, graduated test mixers, and the like glass chemical ware.

Measuring cylinders, and the like glass chemical ware are made by blowing from the pot, rolling the blown mass to cylindrical shape and finally providing them with a solid foot, which is fused on during the process of manufacture. The apparatus thus produced are never truly cylindrical but they taper in one direction or the other.

When these vessels are intended to be used for the accurate measuring of liquids, especially in small quantities they have to be graduated. Owing to the above mentioned irregularity of shape, the graduation is very difficult, and is therefore liable to be incorrect.

Moreover the cleaning of such vessels, especially when they are used for instance for oils, varnishes, viscous or resinous and the like liquids, is very difficult. It is also very difficult to perfectly dry such vessels.

The present invention aims at overcoming the aforesaid difficulties.

To this end, according to the invention the cylindrical part of the measure, instead of being made by blowing from the pot is made from a drawn glass tube provided at its lower end with a removable plug or stopper and foot.

The advantages of this new manner of manufacture are firstly, that since the drawn tubes used are absolutely and uniformly cylindrical, exact graduation is a very simple matter, and secondly, that the vessel can be easily cleaned on the detachable stopper-foot being removed.

The stopper-foot may be ground in, the increased cost of grinding in such glass foot being compensated for by the reduced cost of graduation.

Instead of the stopper-foot being of glass and being ground in, a foot of any other suitable shape and material may be used which is fitted into the lower part of the cylinder in any convenient manner, for instance, by means of a plug or stopper, either by turning the foot to form a stopper or by forming a socket in the foot and securing a plug or stopper therein, the lower end of the cylinder being closed by such plug or stopper, alternatively the lower end of the cylinder may be splayed or flared to form the foot and be closed by a stopper.

In order to clearly understand the invention, reference is made to the accompanying drawing in which Figures 1–6 are elevations partly in vertical sections of various constructions, embodying the invention. In these drawings—

*a* is the cylindrical part of the measure which is made from a drawn glass tube, and provided with equidistant graduations.

*b* is the stopper closing said cylindrical part *a*.

*c* is the foot or base of the vessel.

Referring to Fig. 1, the lower end of the cylindrical part *a* of the vessel is slightly enlarged, and a glass stopper *b* which is integral with the foot *c* is ground in said enlarged part.

In Fig. 2, the lower part of the cylindrical vessel *a* diverges conically and a stopper *b* which is integral with the glass foot *c* is ground therein.

In Fig. 3, the lower end of the cylinder is splayed or flared to form the foot *c'* and is provided with an ordinary stopper or plug which is inert to the chemicals which are to be used.

Figures 4, 5, 6:
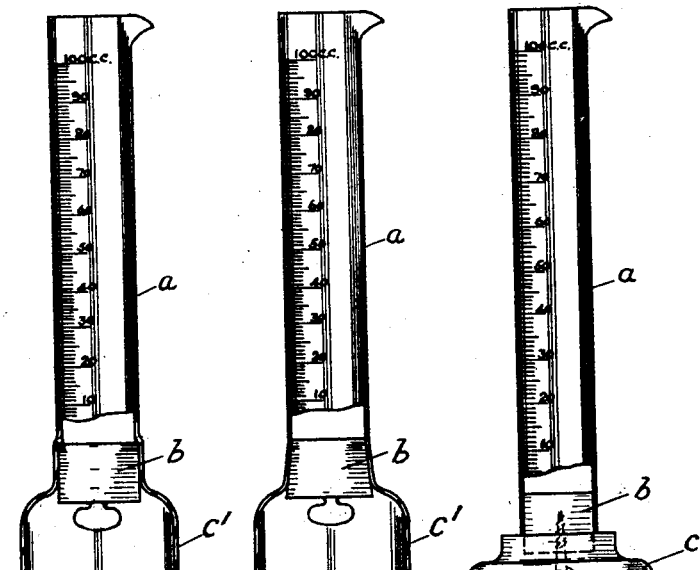

In Fig. 4, the lower end of the cylindrical part *a* is likewise splayed or flared to form the foot *c'* on which the cylinder stands, the part of the cylinder which merges into the flared part, being slightly enlarged, and a glass stopper *b* is ground therein.

In Fig. 5, the lower end of the cylindrical part is splayed or flared to form the foot *c'* on which the cylinder stands and the part of the cylinder which merges into the flared part diverges conically and a glass stopper *b* is ground therein.

Fig. 6, shows the foot *c* turned with the stopper *b* in one piece from ebonite wood or the like material, or, as shown in dotted lines, the foot *c* may be considered to be formed with a socket in which the plug or stopper *b* is secured, for instance, by a screw *d*.

What I claim as new and desire to secure by Letters Patent of the United States is:

1. Measuring cylinders, graduated test mixers and the like glass chemical ware, comprising a cylinder of uniform gage made from a drawn glass tube and provided with equidistant graduations, a bottom consisting of a removable stopper, and a foot on which said cylinder stands.

2. Measuring cylinders, graduated test mixers and the like glass chemical ware, comprising a cylinder of uniform gage made from a drawn glass tube and provided with equidistant graduations, and a bottom consisting of a removable stopper which serves at the same time as a foot on which the cylinder stands.

3. Measuring cylinders, graduated test mixers and the like glass chemical ware comprising a cylinder of uniform gage made from a drawn glass tube and provided with equidistant graduations and a bottom consisting of a removable ground-in glass stopper which serves at the same time as a foot on which the cylinder stands.

4. Measuring cylinders, graduated test mixers and the like glass chemical ware, comprising a cylinder of uniform gage made from a drawn glass tube and provided with equidistant graduations and a bottom consisting of a removable stopper turned to form a foot.

In testimony whereof I have affixed my signature.

ALBERT MOND.